US012681615B2

(12) United States Patent
Choi

(10) Patent No.: US 12,681,615 B2
(45) Date of Patent: Jul. 14, 2026

(54) DISPLAY DEVICE USING DETACHABLE INPUT DEVICE AND DISPLAY CONTROL METHOD USING SAME

(71) Applicant: HYUNDAI MOBIS CO., LTD., Seoul (KR)

(72) Inventor: Won Hyok Choi, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 154 days.

(21) Appl. No.: 18/377,521

(22) Filed: Oct. 6, 2023

(65) Prior Publication Data

US 2024/0126400 A1 Apr. 18, 2024

(30) Foreign Application Priority Data

Oct. 18, 2022 (KR) ........................ 10-2022-0134013

(51) Int. Cl.
| | |
|---|---|
| *G06F 3/02* | (2006.01) |
| *G06F 3/041* | (2006.01) |
| *G06F 3/044* | (2006.01) |
| *G06F 3/0481* | (2022.01) |
| *G06F 3/04847* | (2022.01) |
| *G06F 3/0488* | (2022.01) |

(52) U.S. Cl.
CPC .............. *G06F 3/0481* (2013.01); *G06F 3/02* (2013.01); *G06F 3/0412* (2013.01); *G06F 3/044* (2013.01); *G06F 3/04847* (2013.01); *G06F 3/0488* (2013.01)

(58) Field of Classification Search
CPC ........ G06F 3/0481; G06F 3/02; G06F 3/0412; G06F 3/044; G06F 3/04847; G06F 3/0488
See application file for complete search history.

(56) References Cited

U.S. PATENT DOCUMENTS

| | | | | |
|---|---|---|---|---|
| 5,390,296 A | * | 2/1995 | Crandall ............. | G06F 15/0225 |
| | | | | 715/219 |
| 2015/0169077 A1 | * | 6/2015 | Lee ........................ | B60K 35/50 |
| | | | | 345/184 |
| 2020/0174587 A1 | * | 6/2020 | Park ........................ | B60K 35/60 |
| 2022/0359141 A1 | * | 11/2022 | Hill .................... | H01H 36/0033 |
| 2025/0037947 A1 | * | 1/2025 | Seo ......................... | H01H 13/10 |

OTHER PUBLICATIONS

Thomas Geymayer et al., Collaborative Distributed Cognition Using a Seamless Desktop Infrastructure, Mar. 20, 2016, Workshop on Immersive Analytics, pp. 7-12 (Year: 2016).*
Katja Krug et al., CleAR Sight: Exploring the Potential of Interacting with Transparent Tablets in Augmented Reality, Oct. 1, 2022, IEEE International Symposium on Mixed and Augmented Reality, pp. 196-205 (Year: 2022).*

* cited by examiner

*Primary Examiner* — Tam T Tran
(74) *Attorney, Agent, or Firm* — Morgan Lewis & Bockius LLP

(57) ABSTRACT

Disclosed herein is a display device including a touchscreen configured to detect capacitive touch, a detachable input device configured to input the capacitive touch to the touchscreen, and at least one controller. The at least one controller may be configured to determine, when the detachable input device is disposed on the touchscreen, a type of the detachable input device disposed on the touchscreen, output a user interface to be output on the touchscreen based on the type of the detachable input device, and execute a program based on an operation of the detachable input device when the capacitive touch is input to the touchscreen from the detachable input device.

7 Claims, 12 Drawing Sheets

Console Display 5100
5500
5200
5400
5600
5450
5300

<Attached to touchscreen>

Contact occurs

<Button pressed>

Maintaining the GAP

<Before pressing button>

DISPLAY DEVICE USING DETACHABLE INPUT DEVICE AND DISPLAY CONTROL METHOD USING SAME

Pursuant to 35 U.S.C. § 119(a), this application claims the benefit of earlier filing dates and right of priority to Korean Patent Application No. 10-2022-0134013, filed on Oct. 18, 2022, the contents of which are hereby incorporated by reference in their entirety.

BACKGROUND OF THE DISCLOSURE

Field of the Disclosure

The present disclosure relates to a vehicle display input device detachably mounted to a vehicle display and capable of receiving user input.

Discussion of the Related Art

The statements in this section merely provide background information related to the embodiments and may not constitute prior art.

As is generally known, the interior of a vehicle is provided with numerous functions that can be controlled by the occupants of the vehicle. These functions include an air conditioning system, entertainment electronics, communication means such as, for example, cell phones and Internet applications, and a navigation system.

In order to improve operability, conventional systems require the addition of electrical circuits such as control button mechanisms, switches, and small lamps to add simple buttons on the screen, which makes it difficult to intuitively recognize inputs when touching touchpad-based AVNs and air conditioning devices.

In addition, an interface device to execute and control the diversified functions of the AVN is required, and there are limitations in equipping a complex vehicle AVN with a physical interface device having various input functions.

SUMMARY OF THE DISCLOSURE

To solve the problems described above, one embodiment of the present disclosure seeks to provide a display device capable of recognizing input on a touchscreen by providing a detachable input device for capacitive touch input on the top of the touchscreen.

The objects of the present disclosure are not limited to the above-mentioned technical objects, and other technical objects not mentioned above will become apparent to one of ordinary skill in the art from the following description.

To achieve these objects and other advantages and in accordance with the purpose of the disclosure, as embodied and broadly described herein, a display device according to any one of the embodiments of the present disclosure may include a touchscreen configured to detect capacitive touch, a detachable input device configured to input the capacitive touch to the touchscreen, and at least one controller. The at least one controller may be configured to determine, when the detachable input device is disposed on the touchscreen, a type of the detachable input device disposed on the touchscreen, output a user interface to be output on the touchscreen based on the type of the detachable input device, and execute a program based on an operation of the detachable input device when the capacitive touch is input to the touchscreen from the detachable input device.

According to an embodiment, the detachable input device may include at least one of a physical button layer or a dial knob.

According to an embodiment, the physical button layer may include a plurality of physical buttons configured as transparent windows allowing light output from the touchscreen to be output to an outside, button protrusions disposed to correspond to each of the plurality of physical buttons to input the capacitive touch to the touchscreen, and a return mechanism disposed to create a gap between the button protrusions and the touchscreen.

According to an embodiment, the dial knob may include at least one of a swipe-type dial knob or a keypad-type dial knob.

According to an embodiment, the swipe-type dial knob may include a stationary part configured to contact the touchscreen, a rotatable part rotatably coupled to a circumference of the stationary part, an eccentric protrusion coupled to the rotatable part to input the capacitive touch to the touchscreen, and a transparent button extending from a bottom surface to a top surface of the rotatable part, and the transparent button having an exposed top surface.

According to an embodiment, the eccentric protrusion may include at least one of a contact type protrusion disposed to maintain contact with the touchscreen, or a non-contact type protrusion disposed at a predetermined distance from the touchscreen.

According to an embodiment, the swipe-type dial knob may be configured such that a contact position of the eccentric protrusion is swiped in an arc shape on the touchscreen.

According to an embodiment, the keypad-type dial knob may include a stationary part arranged to contact the touchscreen, a rotatable part rotatably coupled to a circumference of the stationary part, a keypad protrusion coupled to the circumference of the stationary part to input the capacitive touch to the touchscreen, and a transparent button extending from a bottom surface to a top surface of the rotatable part, and the transparent button having an exposed top surface. The rotatable part may include a rotating protrusion disposed on a surface thereof abutting the keypad protrusion.

According to an embodiment, the keypad-type dial knob may be configured such that the keypad and the touchscreen remain in a non-contact state, and a region of the keypad protrusion is brought into contact with the touchscreen in response to rotation of the rotating protrusion.

According to any one of the embodiments of the present disclosure, by adding a detachable physical button to a touchpad-based display device, an inexpensive and simple display device may be manufactured, resulting in significant cost savings.

The effects obtainable from the present disclosure are not limited to those mentioned above, and other effects not mentioned above will be apparent to one having ordinary skill in the art from the following description.

BRIEF DESCRIPTION OF THE DRAWINGS

The accompanying drawings, which are included to provide a further understanding of the invention and are incorporated in and constitute a part of this application, illustrate embodiment(s) of the present disclosure and together with the description serve to explain the principle of the present disclosure. In the drawings.

DETAILED DESCRIPTION OF THE DISCLOSURE

Figure 1:
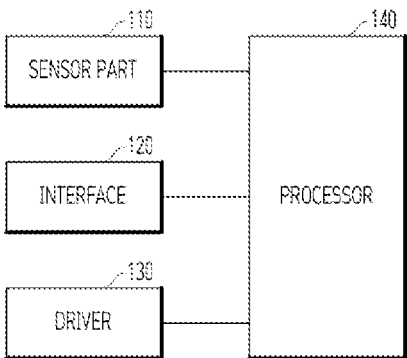
FIG. 1 illustrates a schematic configuration of a vehicle system according to one embodiment of the present disclosure.

Hereinafter, embodiments of the present disclosure will be described in detail with reference to the accompanying drawings to provide a further understanding of the present disclosure to those of ordinary skill in the art. It will be apparent to those skilled in the art that the present disclosure can be implemented in various different forms and is not limited to the embodiments described herein. In the drawings, parts irrelevant to the description are omitted in order to clearly describe the present disclosure. Wherever possible, the same reference numbers will be used throughout the specification to refer to the same or like parts.

Throughout the specification, whenever any part is described as "including" any component, it is meant to be inclusive of other components, not exclusive of other components, unless explicitly stated otherwise.

FIG. 1 illustrates a schematic configuration of a vehicle system according to one embodiment of the present disclosure.

In some embodiments of the present disclosure, a vehicle may include a sensor module 110, an interface 120, a drive module 130, and a processor 140.

The sensor module 110 may include at least one sensor capable of recognizing conditions inside and/or outside the vehicle. The sensor module 110 may include, for example, a camera sensor, an infrared sensor, a radar sensor, a voice sensor, a temperature sensor, and a humidity sensor.

The interface 120 may include at least one interface to provide a user of the vehicle with various audiovisual data or information related or unrelated to the vehicle, and/or control tools for the vehicle or component(s) thereof. The interface 120 may include, for example, a display(s) provided for the occupant(s), and/or an acoustic device(s) provided for the occupant(s). The interface 120 may exchange signals with at least one display device in the vehicle in a wired or wireless manner. The interface 120 may convert an input by the user of the vehicle into an electrical signal and provide the signal to the processor 140.

The drive module 130 may physically drive and/or operate internal or external components of the vehicle based on the control of the processor 140. The drive module 130 may change, for example, the physical position(s) of the wheel(s), steering wheel(s), seat(s), and display(s) of the vehicle.

The processor 140 may include at least one processor. The at least one processor in the processor 140 may be electrically connected to components (e.g., the sensor module, the interface, and the communicator (not shown)) of the vehicle to exchange signals and to control the components of the vehicle. The processor 140 may further include at least one memory (not shown). The at least one processor may be referred to as a controller, microcontroller, microprocessor, or microcomputer. The at least one processor may be implemented by hardware, firmware, software, or a combination thereof. For example, the at least one processor may include one or more application specific integrated circuits (ASICs), one or more digital signal processors (DSPs), one or more digital signal processing devices (DSPDs), one or more programmable logic devices (PLDs), or one or more field programmable gate arrays (FPGAs). The functions, procedures, proposals, and/or methods disclosed herein may be implemented using firmware or software, and the firmware or software may be implemented to include modules, procedures, and functions. Firmware or software configured to perform the functions, procedures, proposals, and/or methods disclosed herein may be included in at least one processor, or may be stored in at least one memory and executed by at least one processor. The features, procedures, proposals, and/or methods disclosed herein may be implemented using firmware or software in the form of code, instructions, and/or a set of instructions.

The processor 140 may generate control signals for the sensor module 110, the interface 120, and/or the drive module 130 based on electrical signals received from the sensor module 110 and/or the interface 120.

The at least one memory may be connected to the at least one processor and may store various kinds of information related to the operation of the at least one processor. For example, the at least one memory may store software code that includes instructions for performing some or all of the processes controlled by the at least one processor, or for performing the procedures and/or methods described/proposed below. The at least one memory may store commands, instructions, or programs, which, when executed, may cause the at least one processor operably connected to the at least one memory to perform operations according to some embodiments of the present disclosure.

The vehicle may further include a communicator. The communicator may include one or more transceivers, and may receive user data, control information, wireless signals/channels, etc. referred to in the functions, procedures, proposals, methods, and/or flowcharts of operation disclosed herein from one or more other devices via the one or more transceivers. For example, the one or more transceivers may be connected to the processor 140, and may transmit and/or receive wireless signals. For example, the at least one processor in the processor 140 may control the one or more transceivers to transmit user data, control information, or wireless signals to the at least one other device. Further, the processor 140 may control the one or more transceivers to receive user data, control information, or wireless signals from one or more other devices. Further, the one or more transceivers may be connected to one or more antennas. The one or more transceivers may be configured to transmit and/or receive user data, control information, wireless signals/channels, etc. to and/or from the other device(s) through the one or more antennas.

Figure 2:
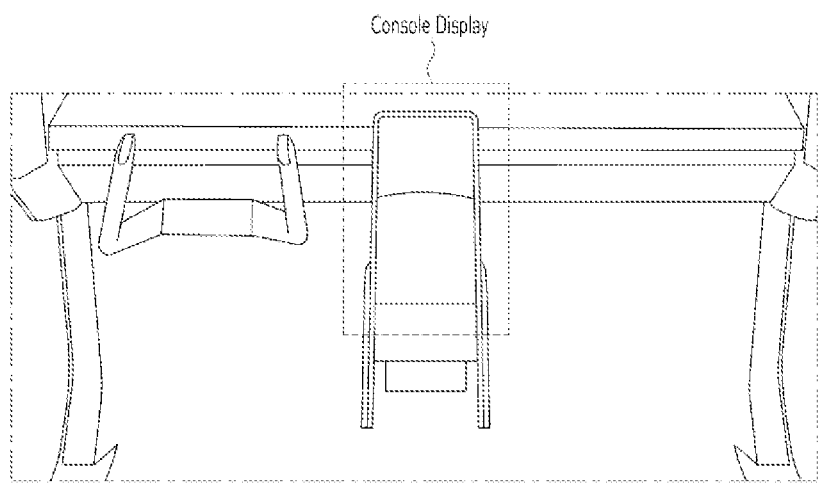
FIG. 2 illustrates a configuration of an interior of a vehicle according to one embodiment of the present disclosure.

FIG. 2 illustrates a configuration of an interior of a vehicle according to one embodiment of the present disclosure.

First, the vehicle according to the embodiment illustrated in FIG. 2 may include at least one camera configured to detect conditions inside said vehicle, a head-up display (HUD), a front console display(s) configured to provide audiovisual information to the occupant(s), and a console display(s) configured to provide the occupant(s) with status information about the vehicle and/or control over the gears, air conditioning, and/or seat(s) of the vehicle. The vehicle may also include a steering wheel, seat(s), and light(s).

The console display according to one embodiment of the present disclosure may be disposed on a mounting device positioned on the center fascia of the console. The console display according to one embodiment of the present disclosure may be disposed on one side of the driver's seat, or in the space between the driver's seat and the front passenger seat, if the front passenger seat is present.

FIGS. 3 to 6 illustrate a display device using a detachable input device according to one embodiment of the present disclosure.

Figure 3:
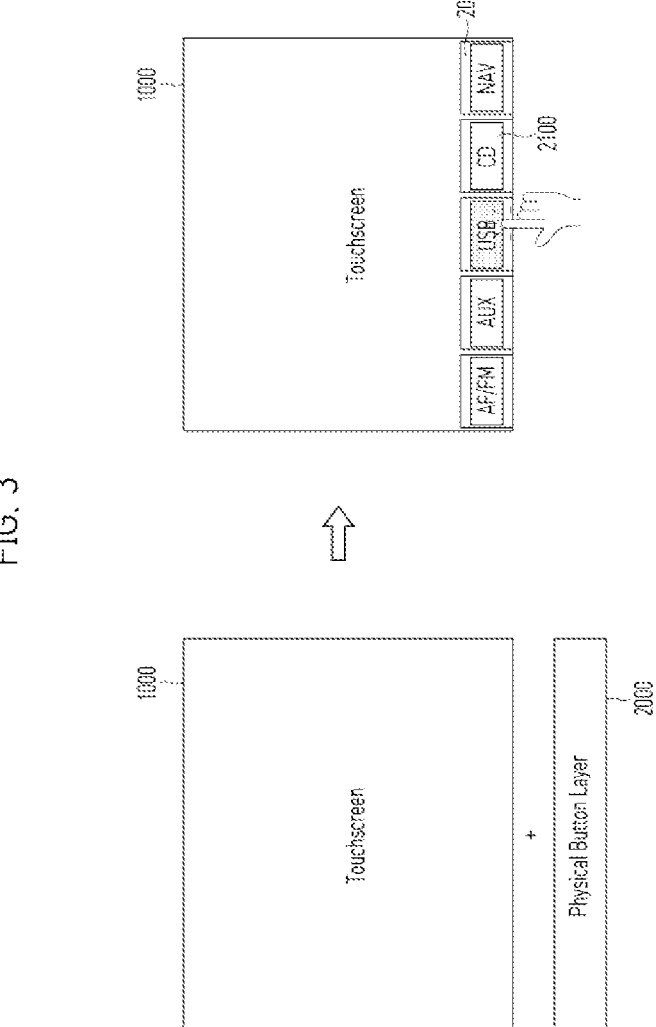
FIGS. 3 to 6 illustrate a display device using a detachable input device according to one embodiment of the present disclosure.
Figure 4:
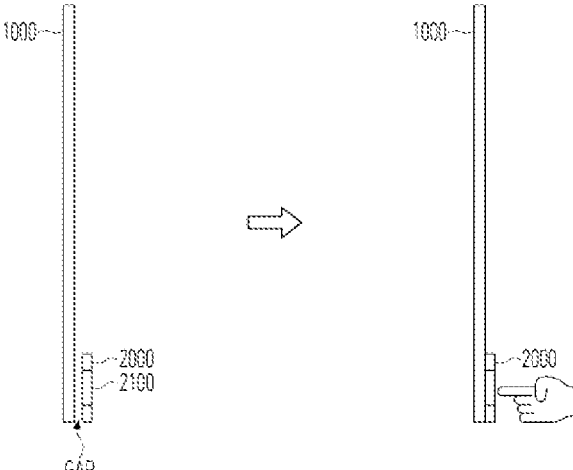

Referring to FIGS. 3 and 4, a display device using a detachable input device may include a touchscreen and a detachable input device.

The display device may include a touchscreen that allows input and output to be performed in the same area, and a controller (not shown) configured to control a program output to the touchscreen.

The detachable input device may be a physical button mechanism including a touchscreen-based capacitive touch-able material. The detachable input device may include a physical button layer. The physical button layer may be a mechanism having a plurality of transparent buttons arranged in a bar-like layer. The transparent buttons may include a transparent window for outputting light and text from the touchscreen to the outside.

The physical button layer may be arranged in such a way that it rests on the top surface of the touchscreen, and may be positioned anywhere in the touchscreen area. For example, the physical button layer may be disposed in various positions depending on the program currently being executed.

By default, there may be a gap between the physical button layer and the display. When a button is pressed, the touchscreen and the button come into contact. A capacitive tactile material may be attached to the bottom of the button to allow a touch to be recognized on the touchscreen.

The controller (not shown) may determine a type of the detachable input device disposed on the touchscreen.

The controller (not shown) may output a user interface to be displayed on the touchscreen based on the type of detachable input device.

The controller (not shown) may output a user interface (UI) based on the number of buttons in the physical button layer and the functions frequently used on the screen.

For example, when the physical button layer consists of five buttons, the controller (not shown) may assign AM/PM, AUX, USB, CD, and NAV to the respective buttons and output the same through the UI.

The controller (not shown) may display the UI on the screen according to the physical button layer, or accept an input event corresponding thereto.

When a capacitive touch is input to the touchscreen from the detachable input device, the controller (not shown) may execute a program based on the operation of the detachable input device.

When the physical button layer is mounted on the display, the controller (not shown) may display a button function change, a button design and color change, a button on/off indication, and the like.

For example, when a user presses a button corresponding to the USB on the physical button layer, the controller (not shown) may change the color of the area corresponding to the USB. Thus, the user can recognize the interaction according to the input through the transparent button.

Referring to FIG. 5, an example of outputting a UI associated with a physical button layer is shown.

Figure 5A:
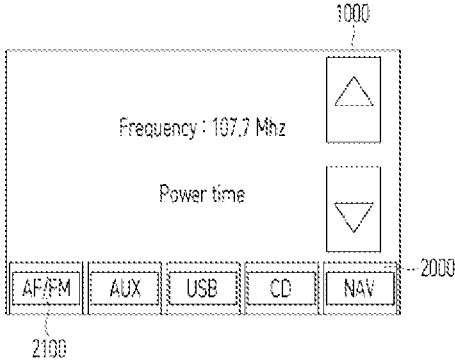

Referring to FIG. 5A, the user interface is shown in a senior mode.

When the physical button layer consists of 5 buttons, the controller (not shown) may assign the functions of AM/PM, AUX, USB, CD, and NAV to the respective buttons using the UI and output the same.

When the UI is in senior mode, the controller (not shown) may change the color of the text assigned to the physical button layer and output the same. For example, the text AM/FM may be changed from black to green.

In addition, the controller (not shown) may provide output corresponding to the AM/FM function to the touchscreen. In this case, the output corresponding to the AM/FM function may include a frequency and a title of a signal corresponding to the frequency.

Figure 5B:
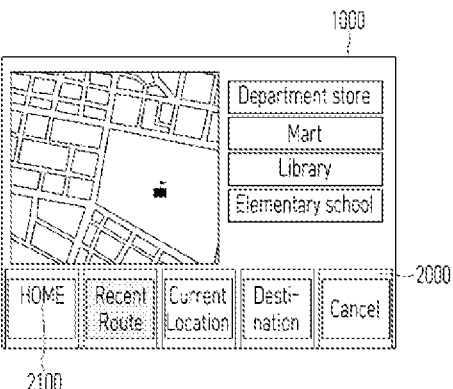

Referring to FIG. 5B, a case where the UI is in the navigation mode is illustrated.

The controller (not shown) may assign and output a function that is assigned to a physical button layer through the UI as a function that is frequently used in navigation.

For example, when the physical button layer consists of five buttons, the controller (not shown) may assign the functions of "HOME", "Recent Route", "Current Location", "Destination", and "Cancel" to the respective buttons using the UI.

When the UI is in the navigation mode, the controller (not shown) may change and output the color of the text and the color of the button assigned to the physical button layer.

For example, the text corresponding to "Recent Route" may be changed from black to green. Also, the color of the button corresponding to "Recent Route" may be changed from blue to yellow.

In addition, the controller (not shown) may provide output corresponding to the recent route to the touchscreen. In this case, the output corresponding to the recent route may include a map and a location corresponding to the recent route.

Figure 6:
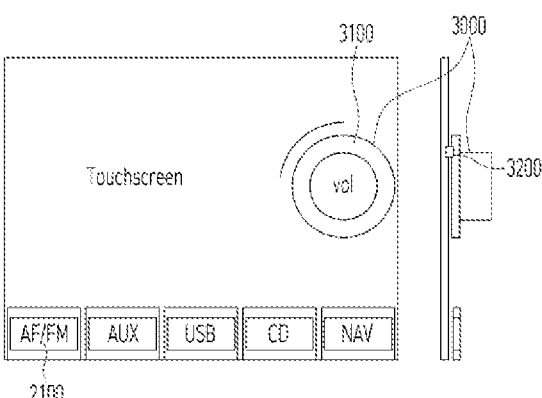

Referring to FIG. 6, a display device using a detachable input device may include a touchscreen 1000, a physical button layer 2000, and a dial knob 3000.

The touchscreen 1000 and physical button layer 2000 are identical to those in FIGS. 3 to 5, and thus a detailed description thereof will be skipped.

The detachable input device may be a physical button mechanism including a touchscreen-based capacitive tactile material. The detachable input device may include the physical button layer 2000 and the dial knob 3000.

The dial knob 3000 may be positioned to rest on a top surface of the touchscreen, and may be positioned anywhere in the touchscreen area. For example, the dial knob may be disposed in various locations depending on the program currently being executed.

The dial knob may include a transparent button for outputting light and text from the touchscreen to the outside.

An eccentric protrusion may be disposed at the bottom of the dial knob, and rotation of the dial knob may cause the eccentric protrusion to change a touch point on the touch screen to trigger an event. The eccentric protrusion may be configured as a capacitive touch type element that keeps in constant contact with the display or a non-contact type element that detects a position while maintaining a distance from the display.

The controller (not shown) may determine a type of the detachable input device disposed on the touchscreen.

The controller may output a UI to be displayed on the touchscreen based on the type of the detachable input device.

The controller (not shown) may output a UI based on the number of buttons in the physical button layer and functions that are frequently used on the screen.

When the dial knob is attached, the controller may output a UI corresponding to the rotation of the dial knob based on the program being output to the touchscreen.

For example, the controller (not shown) may include assigning a function of at least one of air conditioner temperature, airflow, or volume (VOL) to the UI based on the dial knob.

When the capacitive touch is input to the touchscreen from the detachable input device, the controller (not shown) may execute a program based on the operation of the detachable input device.

When a contact position is input in the shape of an arc on the touchscreen according to the rotational motion of the dial knob, the controller (not shown) may perform a control operation to adjust the assigned function.

For example, the controller (not shown) may detect an operation of rotating the dial knob of the detachable input device about the rotation axis X and perform a corresponding function according to the currently executed program.

Figure 7:
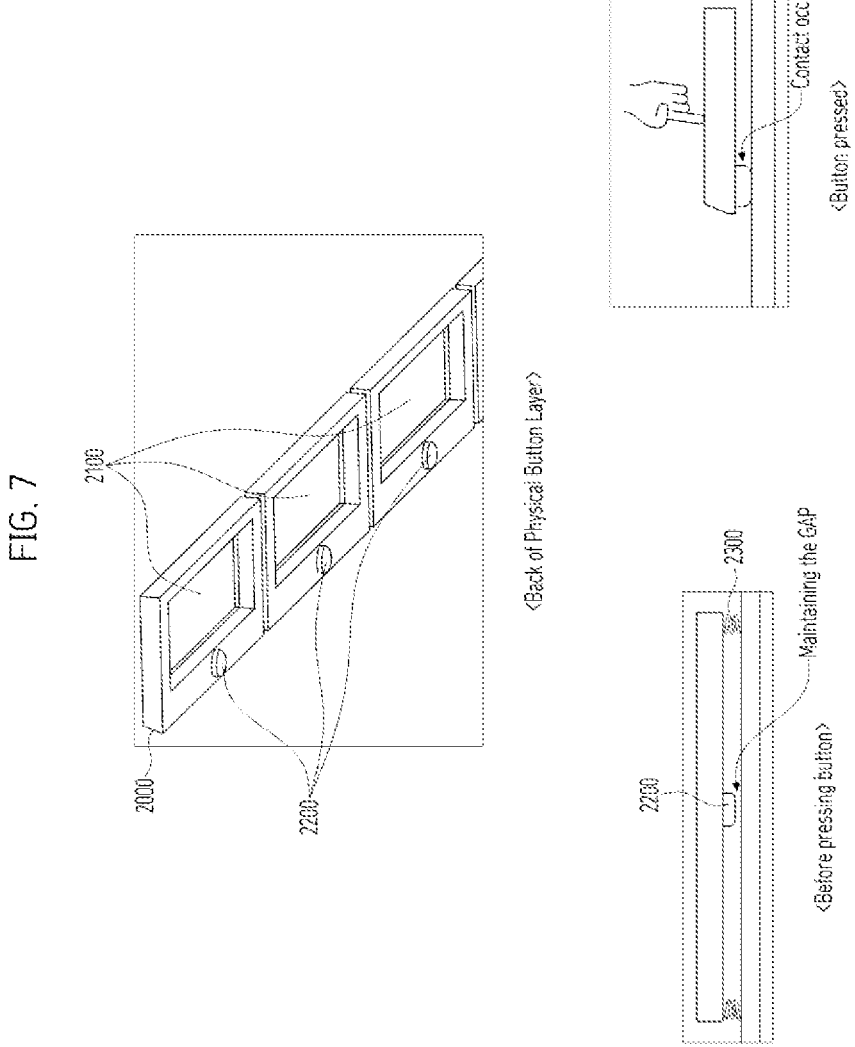
FIG. 7 illustrates a configuration of a physical button layer according to one embodiment of the present disclosure.

FIG. 7 illustrates a configuration of a physical button layer according to one embodiment of the present disclosure.

Referring to FIG. 7, a physical button layer 2000 according to an embodiment of the present disclosure may include a transparent button 2100, a button protrusion 2200, and a return mechanism 2300.

The transparent button 2100 may be formed of a non-conductive material that is not responsive to the touchscreen 1000. The transparent button 2100 may be configured as a transparent window, and may be formed of a material that allows light to be transmitted therethrough such that information output on the touchscreen is output to the outside.

The button protrusion 2200 may be formed of a material that allows for capacitive touch, such as conductive rubber. The button protrusion 2200 may be disposed on the physical button layer 2000, and may be disposed on a surface facing the touchscreen 1000.

The return mechanism 2300 may be formed of various materials, such as a spring, a leaf spring, or rubber. The return mechanism 2300 may be disposed on one side of the transparent button 2100. For example, the return mechanism 2300 may be disposed on a surface of the physical button layer 2000 on which the button protrusion 2200 is disposed, and the button protrusion 2200 may be spaced apart from the touchscreen 1000 by a preset distance by the return mechanism 2300.

When the physical button layer 2000 is disposed on the touchscreen 1000, a certain gap may be formed between the touchscreen 1000 and the button protrusion 2200 by the return mechanism 2300.

When the transparent button 2100 is pressed by user input, the touchscreen 1000 and the button protrusion 2200 may come into contact with each other, and the touchscreen 1000 may respond to the user input through capacitive touch of the button protrusion 2200.

Figure 8:
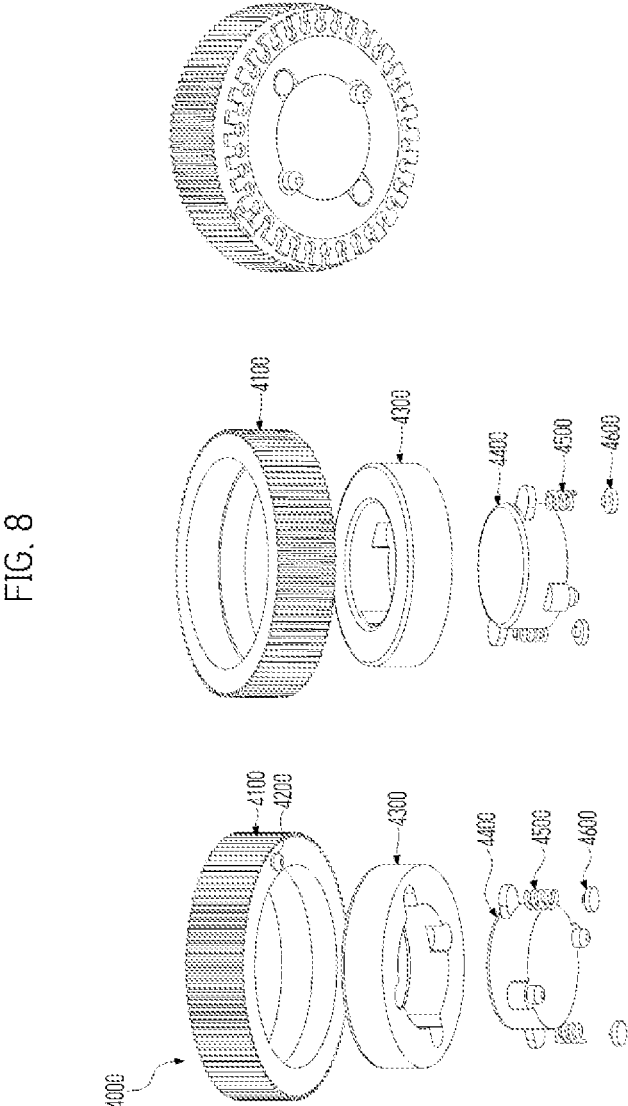
FIGS. 8 and 9 illustrate a configuration of a swipe-type dial knob according to one embodiment of the present disclosure.
Figure 9:
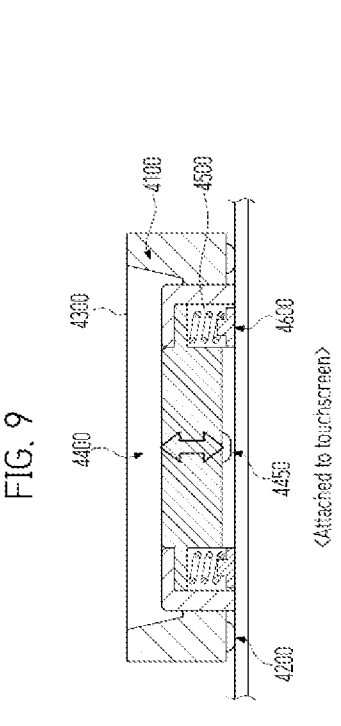
Figure 9:
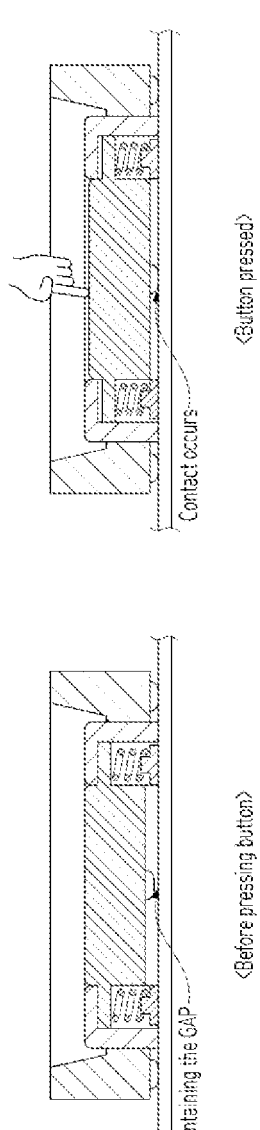

FIGS. 8 and 9 illustrate a configuration of a swipe-type dial knob according to one embodiment of the present disclosure.

FIG. 8 is an exploded view of a swipe-type dial knob according to one embodiment of the present disclosure, and FIG. 9 is a cross-sectional view of the swipe-type dial knob according to one embodiment of the present disclosure.

Referring to FIGS. 8 and 9, a swipe-type dial knob 4000 according to an embodiment of the present disclosure may include a rotatable part 4100, an eccentric protrusion 4200, a stationary part 4300, and a transparent button 4400.

The swipe-type dial knob 4000 may be formed in a cylindrical shape.

According to one embodiment, the swipe-type dial knob 4000 may have the stationary part 4300 having a specific diameter and the rotatable part 4100 installed to surround an outer circumferential surface of the stationary part 4300. The rotatable part 4100 may be rotated about the stationary part 4300.

The rotatable part 4100 may be formed of an insulating material to prevent malfunctions that may be caused by contact with the touchscreen 1000. The outer circumferential surface of the rotatable part 4100 may be provided with a predetermined pattern through a knurling process or the like to maximize friction on the outer circumferential surface for advantageous operability.

The eccentric protrusion 4200 may be disposed on a surface of the rotatable part 4100 where the rotatable part 4100 contacts the touchscreen 1000. The eccentric protrusion 4200 is a mechanism for providing user input to the touchscreen 1000 by capacitive touch. While the eccentric protrusion 4200 is arranged to have one touch area in the exemplary embodiment of the present disclosure, the eccentric protrusion 4200 may have a various number and various layouts of touch areas.

According to one embodiment, the size and layout structure of the eccentric protrusions 4200 may allow the touchscreen 1000 to recognize multi-contact touch, recognize a touch pattern configured using at least one value of the position, size, and number of the eccentric protrusions 4200, and calculate coordinates based on the touch pattern to detect user input by the dial knob.

According to one embodiment, for example, when the swipe-type dial knob 4000 is rotated, the contact position of the eccentric protrusion 4200 is swiped on the touchscreen in the shape of an arc, and the change in touch position may be used as an analog input. In this way, functions such as adjusting the air-conditioning temperature, airflow, and volume of the vehicle may be used.

According to one embodiment, the eccentric protrusion 4200 may be configured as a contact type and a non-contact type. When the eccentric protrusion 4200 is of a contact type, it may be formed of a material that allows for capacitive touch, such as conductive rubber. When the eccentric protrusion 4200 is mounted on the touchscreen, the touchscreen and the eccentric protrusion 4200 may remain in contact.

When the eccentric protrusion 4200 is of a non-contact type, a component capable of non-contact position detection on the touchscreen 1000 may be employed and disposed at a preset distance from the touchscreen.

The stationary part 4300 may be formed of an insulating material to prevent malfunctions that may be caused by contact with the touchscreen 1000. The stationary part 4300 is fixed in position on the top surface of the touchscreen 1000, and only the rotatable part 4100 may be rotated clockwise or counterclockwise about the stationary part 4300.

The transparent button 4400 extends from a bottom surface to a top surface of the rotatable part 4100, and may be installed such that the top surface thereof is exposed. According to one embodiment, the transparent button 4400 may be formed of a transparent material such that, when the swipe-type dial knob 4000 is disposed on the touchscreen 1000, light output from the touchscreen 1000 can be output to the outside of the transparent button 4400.

A button protrusion 4450 may be disposed on one side of the transparent button 4400 on a surface facing the touchscreen 1000. The button protrusion 4450 may be formed of a material that allows for capacitive touch, such as conductive rubber.

A return mechanism 4500 may be disposed on one side surface of the transparent button 4400 that faces the touchscreen 1000. The return mechanism 4500 may be formed of various materials, such as a spring, a leaf spring, or rubber. The return mechanism 4500 may be disposed on one side of the transparent button 4400.

A retention seat 4600 may be disposed under the return mechanism 4500 to retain the transparent button 4400 and the return mechanism 4500 when the swipe-type dial knob 4000 is disposed on the touchscreen 1000. The retention seat 4600 may be formed of a non-conductive material to prevent malfunctions that may be caused by contact with the touchscreen 1000.

According to one embodiment, when the swipe-type dial knob 4000 is disposed on the touchscreen 1000, a certain gap may be formed between the transparent button 4400 and the touchscreen 1000. Before the button is pressed, the touchscreen 1000 and the button protrusion 4450 may maintain the gap. Then, when the transparent button 4400 is pressed by user input, the touchscreen 1000 and the button protrusion 4450 may come into contact with each other, and the touchscreen 1000 may respond to the user input through capacitive touch of the button protrusion 4450.

Figure 10:
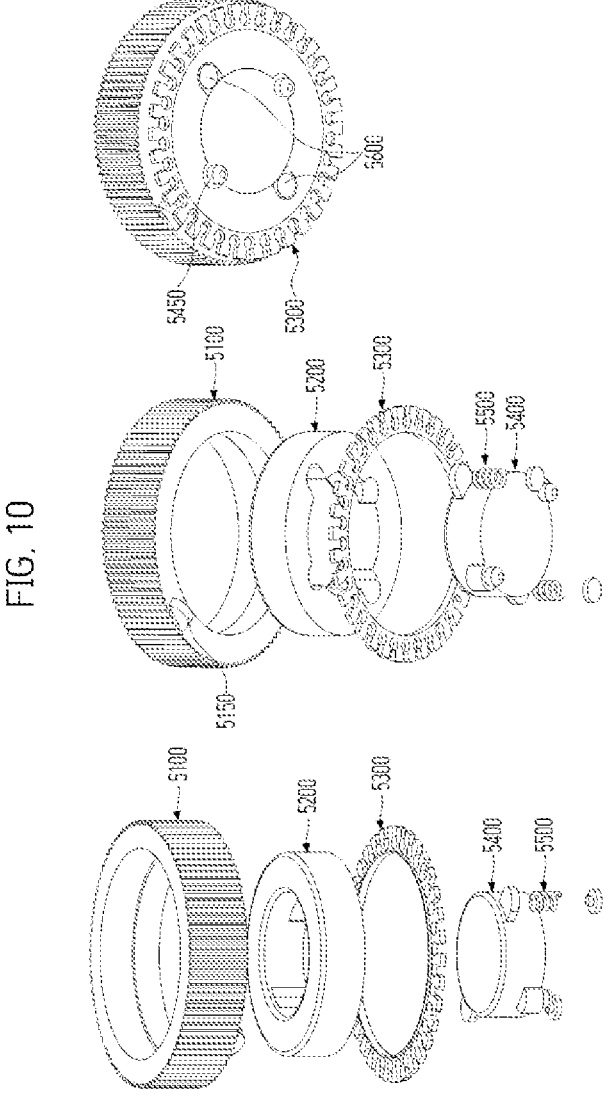
FIGS. 10 and 11 illustrate a configuration of a keypad-type dial knob according to one embodiment of the present disclosure.
Figure 11:
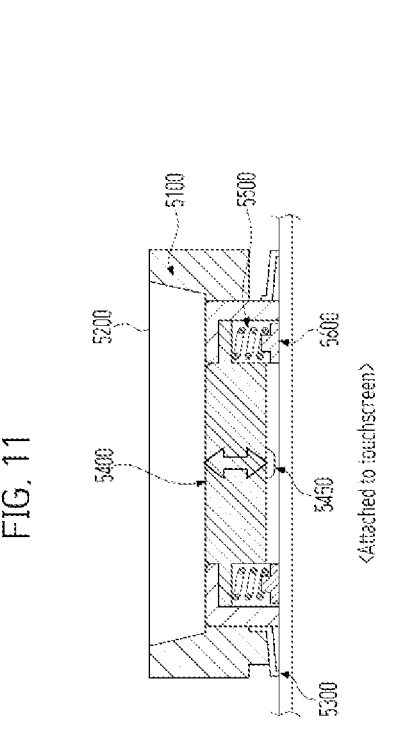
Figure 11:
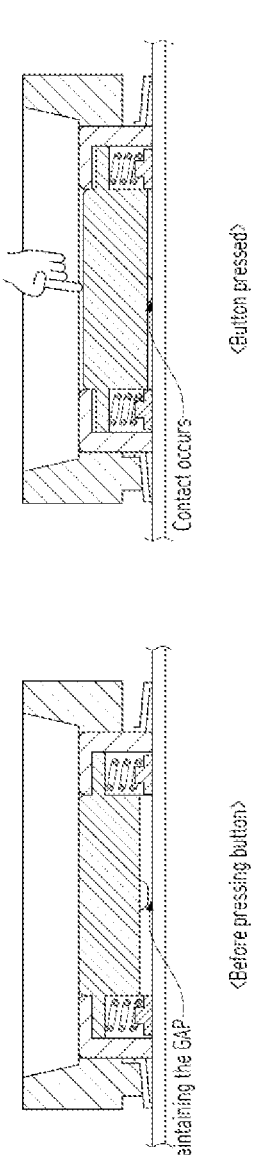

FIGS. 10 and 11 illustrate a configuration of a keypad-type dial knob according to one embodiment of the present disclosure.

Referring to FIGS. 10 and 11, a keypad-type dial knob 5000 according to an embodiment of the present disclosure may include a rotatable part 5100, a stationary part 5200, a keypad protrusion 5300, and a transparent button 5400.

The keypad-type dial knob 5000 may be formed in a cylindrical shape.

According to one embodiment, the keypad-type dial knob 5000 may include a stationary part 5200 having a specific diameter and a rotatable part 5100 arranged to surround an outer circumferential surface of the stationary part 5200. The rotatable part 5100 may be rotated about the stationary part 5200.

The rotatable part 5100 may be formed of an insulating material to prevent malfunctions that may be caused by contact with the touchscreen 1000. The outer circumferential surface of the rotatable part 5100 may have a pattern predetermined to have an advantageous operability by maximizing the friction on the outer circumferential surface through a knurling process or the like.

The rotatable part 5100 may include a rotating protrusion 5150 disposed on a surface abutting the keypad protrusion 5300.

The stationary part 5200 may be formed of an insulating material to prevent malfunctions that may be caused by contact with the touchscreen 1000. The stationary part 5200 is fixed in position on the top surface of the touchscreen 1000, and only the rotatable part 5100 may be rotated clockwise or counterclockwise about the stationary part 5200.

The keypad protrusion 5300 may be disposed around the stationary part 5200. The keypad protrusion 5300 may be disposed on a surface of the rotatable part 5100 that contacts the touchscreen 1000. The keypad protrusion 5300 is a mechanism for providing user input to the touchscreen 1000 by capacitive touch, and may be formed of an elastic material that allows for capacitive touch, such as conductive rubber.

When the keypad-type dial knob 5000 is disposed on the touchscreen 1000, the touchscreen and the keypad protrusion 5300 may have a gap of a predetermined distance. When the keypad protrusion 5300 is pressed by the rotating protrusion 5110 in response to the motion of the rotatable part 5100, the corresponding portion may come into contact with the touchscreen 1000 and thus a touch pattern may be recognized. Then, coordinates may be calculated based on the touch pattern to detect user input by the dial knob.

According to one embodiment, for example, the keypad protrusion 5300 and the touchscreen 1000 may remain in a non-contact state, and the change in frictional force generated by the contact between the rotating protrusion and the keypad protrusion 5300 may provide an appropriate operational feel when the knob is rotated. Furthermore, the change in position of successive touch inputs according to the rotation of the rotating protrusion may be utilized as analog inputs. This allows for functions such as adjusting the temperature, airflow, and volume of the air conditioning in the vehicle.

The transparent button 5400 extends from a bottom surface to a top surface of the rotatable part 5100, and may be installed such that the top surface thereof is exposed. According to one embodiment, the transparent button 5400 may be formed of a transparent material such that, when the keypad-type dial knob 5000 is disposed on the touchscreen 1000, light output from the touchscreen 1000 can be output to the outside of the transparent button 5400.

A button protrusion 5450 may be disposed on one side of the transparent button 5400 on a surface facing the touchscreen 1000. The button protrusion 5450 may be formed of a material that allows for capacitive touch, such as conductive rubber.

A return mechanism 5500 may be disposed on one side surface of the transparent button 5400 that faces the touchscreen 1000. The return mechanism 5500 may be formed of various materials, such as a spring, a leaf spring, or rubber. The return mechanism 5500 may be disposed on one side of the transparent button 5400.

A retention seat 5600 may be disposed under the return mechanism 5500 to retain the transparent button 5400 and the return mechanism 5500 when the keypad-type dial knob 5000 is disposed on the touchscreen 1000. The retention seat 5600 may be formed of a non-conductive material to prevent malfunctions that may be caused by contact with the touchscreen 1000.

According to one embodiment, when the keypad-type dial knob 5000 is disposed on the touchscreen 1000, a certain gap may be formed between the transparent button 5400 and the touchscreen 1000. Before the button is pressed, the touchscreen 1000 and the button protrusion 5450 may maintain the gap. Then, when the transparent button 5400 is pressed by user input, the touchscreen 1000 and the button protrusion 5450 may come into contact with each other, and the touchscreen 1000 may respond to the user input through capacitive touch of the button protrusion 5450.

In another aspect of the present disclosure, the above-described proposals or operations of the disclosure may be provided in the form of code that can be implemented, performed, or executed by a "computer" (a broad concept that includes a system on chip (SoC) or microprocessor, etc.), or an application, computer-readable storage medium, or computer program product storing or including the code, which is also within the scope of the present disclosure.

A detailed description of preferred embodiments of the disclosure has been provided above to enable those skilled in the art to implement and practice the disclosure. Although the disclosure has been described above with reference to preferred embodiments of the disclosure, it will be understood by those skilled in the art that various modifications and changes can be made to the disclosure without departing from the scope of the disclosure. For example, those skilled in the art may utilize each of the configurations described in the above-described embodiments by combining them with each other.

Accordingly, the disclosure is not intended to be limited to the embodiments described herein, but rather to provide the broadest possible scope consistent with the principles and novel features disclosed herein.

What is claimed is:

1. A display device comprising:
a touchscreen configured to detect capacitive touch;
a detachable input device configured to input the capacitive touch to the touchscreen; and
at least one controller,
wherein the at least one controller is configured to:
determine, when the detachable input device is disposed on the touchscreen, a type of the detachable input device disposed on the touchscreen;
output a user interface to be output on the touchscreen based on the type of the detachable input device; and
execute a program based on an operation of the detachable input device when the capacitive touch is input to the touchscreen from the detachable input device,
wherein the detachable input device comprises a physical button layer comprising a plurality of physical buttons, which are transparent windows configured to allow light output from the touchscreen to be output to an outside.

2. The display device of claim 1, wherein the physical button layer comprises:
button protrusions disposed to correspond to each of the plurality of physical buttons to input the capacitive touch to the touchscreen; and
a return mechanism disposed to create a gap between the button protrusions and the touchscreen.

3. A vehicle comprising:
an in-vehicle display disposed inside a vehicle, the in-vehicle display comprising a touchscreen;
a detachable input device configured to input capacitive touch to the touchscreen; and
a display device configured to:

determine, when the detachable input device is disposed on the touchscreen, a type of the detachable input device disposed on the touchscreen;
output a user interface on the touchscreen based on the type of the detachable input device; and
execute a program based on an operation of the detachable input device when the capacitive touch is input to the touchscreen from the detachable input device,
wherein the detachable input device comprises a physical button layer comprising a plurality of physical buttons, which are transparent windows configured to allow light output from the touchscreen to be output to an outside.

4. A method for controlling a display device, the method comprising:
determining a type of a detachable input device disposed on a touchscreen;
outputting a user interface on the touchscreen based on the type of the detachable input device; and
executing a program based on an operation of the detachable input device when capacitive touch is input to the touchscreen from the detachable input device,
wherein the detachable input device comprises a physical button layer comprising a plurality of physical buttons, which are transparent windows configured to allow light output from the touchscreen to be output to an outside.

5. The method of claim 4, wherein the outputting of the user interface on the touchscreen based on the type of the detachable input device comprises:
when the physical button layer is attached, assigning, based on a program being output on the touchscreen, a function of the program to each of a plurality of physical buttons and outputting the same as the user interface.

6. The method of claim 5, further comprising:
assigning at least one of functions of AM/PM, AUX, USB, CD, and NAV to each of the physical buttons through the user interface.

7. The method of claim 6, wherein the executing of the program based on the operation of the detachable input device when the capacitive touch is input to the touchscreen from the detachable input device comprises:
changing a color of text matching a corresponding one of the assigned physical buttons and a color of the corresponding button, the colors of the text and the button being output on the touchscreen.

* * * * *